United States Patent
Zhan

(10) Patent No.: US 8,335,888 B2
(45) Date of Patent: Dec. 18, 2012

(54) NOR FLASH MEMORY CONTROLLER

(75) Inventor: Peng Zhan, Guangdong (CN)

(73) Assignee: Media Tek Singapore Pte. Ltd., Singapore (SG)

( * ) Notice: Subject to any disclaimer, the term of this patent is extended or adjusted under 35 U.S.C. 154(b) by 177 days.

(21) Appl. No.: 12/977,047

(22) Filed: Dec. 22, 2010

(65) Prior Publication Data

US 2012/0151259 A1    Jun. 14, 2012

Related U.S. Application Data

(63) Continuation of application No. PCT/CN2010/079726, filed on Dec. 13, 2010.

(51) Int. Cl.
*G06F 12/00* (2006.01)

(52) U.S. Cl. ........................................ 711/103

(58) Field of Classification Search .................. None
See application file for complete search history.

(56) References Cited

U.S. PATENT DOCUMENTS

| | | |
|---|---|---|
| 7,404,028 B2 | 7/2008 | Baltes |
| 2006/0018152 A1 | 1/2006 | Kawai |
| 2009/0210774 A1* | 8/2009 | Godard et al. ............... 714/801 |
| 2012/0042201 A1* | 2/2012 | Resnick ..................... 714/6.2 |

FOREIGN PATENT DOCUMENTS

| | | |
|---|---|---|
| CN | 100538658 C | 9/2009 |
| CN | 101529370 A | 9/2009 |

OTHER PUBLICATIONS

International application No. PCT/CN2010/079726, International filed: Dec. 13, 2010, International Searching Report mailing date: Jun. 9, 2011.

* cited by examiner

*Primary Examiner* — Hiep Nguyen
(74) *Attorney, Agent, or Firm* — Winston Hsu; Scott Margo

(57) ABSTRACT

A mobile device includes a NOR flash memory for storing settings of the mobile device, a NOR flash memory controller having a memory storing data and/or program code for controlling operations of the NOR flash memory; and a processor coupled to the memory and the NOR flash memory for executing the program code. The program code when executed by the processor causes the memory controller to sequentially write to a sequentially first block of each sector of the NOR flash memory, then write to a sequentially second block of each sector of the NOR flash memory, and when all blocks of all sectors of the NOR flash memory have been written, the memory controller erases a sequentially first sector and then writes to the sequentially first block of the sequentially first sector.

9 Claims, 9 Drawing Sheets

NOR FLASH MEMORY CONTROLLER

CROSS REFERENCE TO RELATED APPLICATIONS

This application is a continuation of PCT/CN2010/079726, filed on Dec. 13, 2010. The contents of PCT/CN2010/079726 are all hereby incorporated by reference.

BACKGROUND OF THE INVENTION

1. Field of the Invention

The present invention relates to a NOR flash memory controller.

2. Description of the Prior Art

Nor (Not Or (electronic logic gate)) flash memory is commonly used in mobile devices due to its non-volatility, durability, and fast access times. Additionally, NOR flash may be read and/or programmed in a random-access manner. Because each bit of NOR flash is by default a "0", and programming is only capable of changing a certain bit from a "0" to a "1", and an entire Block (or Sector) must be erased and rewritten before being able to program a specific bit having a current value of 1 to have a new value of "0".

Most mobile devices require one or more user or factory setting to be stored within the mobile device and NOR flash provides a convenient location for storage of the setting. However, if an error happens to occur within the mobile device before writing of the setting is completed properly, e.g. loss of device power, the mobile device will be unable to properly read that particular setting when the mobile device regains power. This inability to properly read that particular setting can result in malfunction or inoperability of the mobile device that when possible, is normally resolved by a rest of the setting to factory parameters requiring the user to re-enter sometimes numerous user setting by hand.

SUMMARY OF THE INVENTION

It is therefore an objective of this disclosure to provide a writing method for a NOR flash memory controller and to further provide an error recovery method for the NOR flash memory controller that solves the problems of the related art.

A method of operating a NOR flash memory controller may include sequentially writing to a sequentially first block of each sector of the NOR flash memory, followed by the memory controller sequentially writing to a sequentially second block of each sector of the NOR flash memory. When all blocks of all sectors of the NOR flash memory have been written, the memory controller erases a sequentially first sector and then writes to the sequentially first block of the sequentially first sector.

The method may further comprise after erasing the sequentially first sector and then writing to the sequentially first block of the sequentially first sector, erasing the sequentially second sector and then writing to the sequentially first block of the sequentially second sector.

The method may further comprise after the memory controller sequentially writing to a sequentially first block of each sector of the NOR flash memory and before the memory controller sequentially writing to a sequentially second block of each sector of the NOR flash memory, the memory controller sequentially writing to a sequentially third block of each sector of the NOR flash memory.

The method may further comprise error recovery including when there is an error reading from the sequentially first block of the sequentially sector, erasing the sequentially first sector and writing initial data into sequentially first block of the sequentially first sector.

The error recovery may further include an error is detected when reading from the sequentially first block of a sequentially second sector, erasing the sequentially second sector and reading data from the sequentially first block of the sequentially first sector.

The error recovery may further include when an error is detected when reading from a sequentially second block of the sequentially first sector, erasing the sequentially first sector, reading data from the sequentially first block of the sequentially second sector and the read data is written into the sequentially first block of the sequentially first sector.

The error recovery may further include when an error is detected when reading from the sequentially second block of the sequentially second sector, erasing the sequentially second sector, reading data from the sequentially second block of the sequentially first sector and the read data is written into the sequentially first block of the sequentially second sector.

A mobile device, e.g. a cellular phone or portable computer but not limited to these, is further disclosed that includes a NOR flash memory for storing settings of the mobile device, a NOR flash memory controller having a memory storing data and/or program code for controlling operations of the NOR flash memory, and a processor coupled to the memory and the NOR flash memory for executing the program code where the program code when executed by the processor causes the memory controller to sequentially write to a sequentially first block of each sector of the NOR flash memory, then write to a sequentially second block of each sector of the NOR flash memory, and when all blocks of all sectors of the NOR flash memory have been written, the memory controller erases a sequentially first sector and then writes to the sequentially first block of the sequentially first sector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
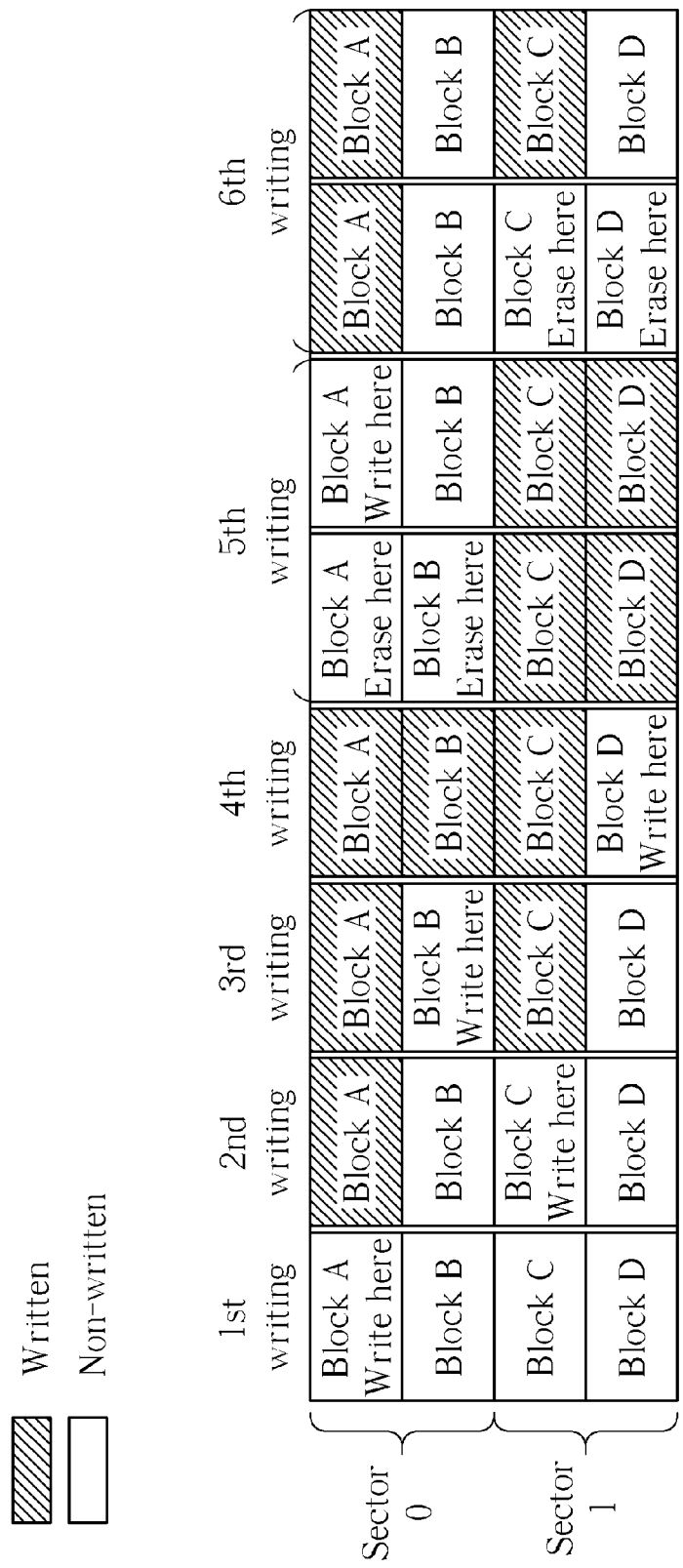
FIG. 1 illustrates a method of writing to a NOR flash memory according to one embodiment of a memory controller.
Figure 2:
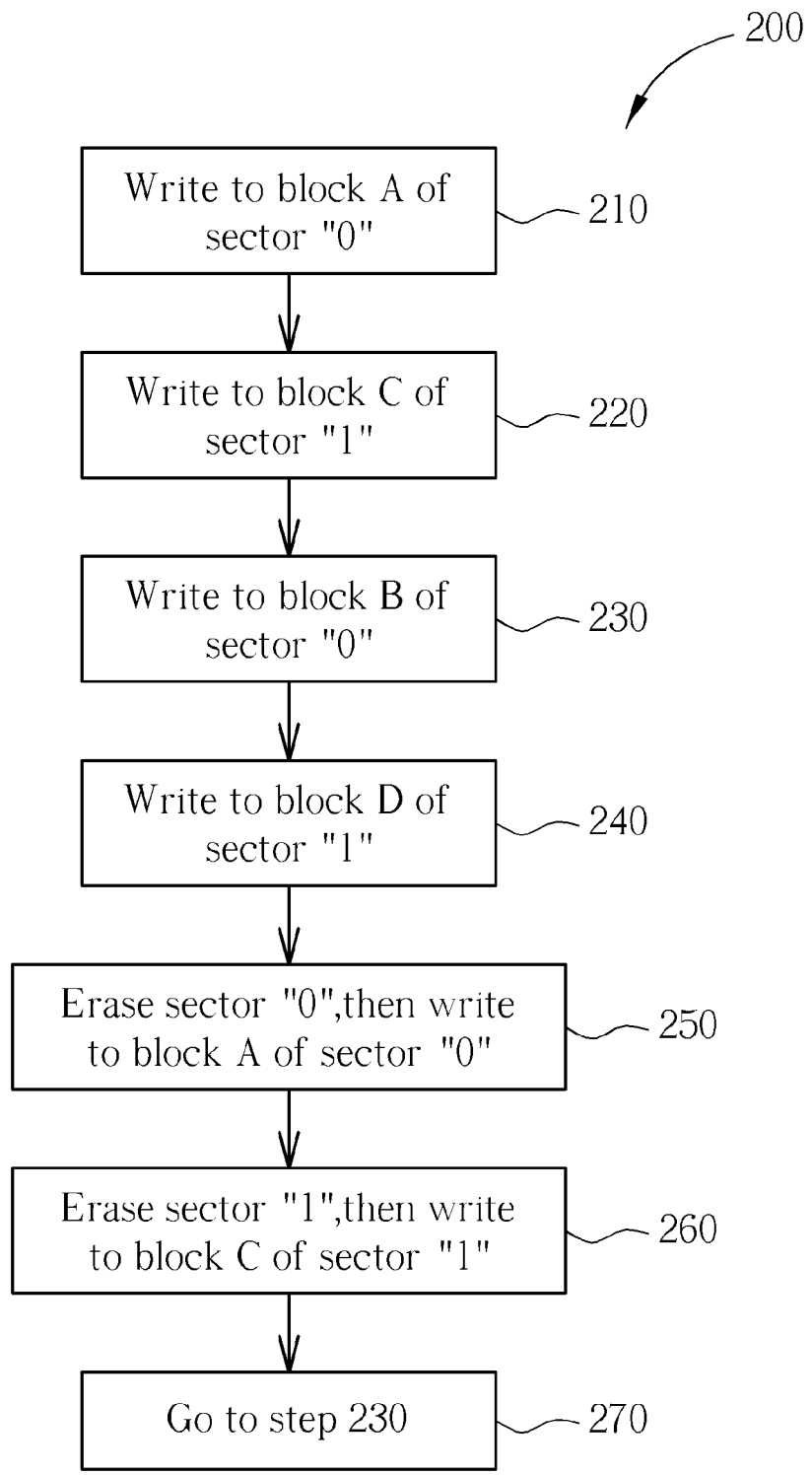
FIG. 2 is a general flow chart illustrating the method of FIG. 1.

Please refer to FIG. 1 which illustrates a method of writing to a NOR flash memory according to one embodiment of a memory controller and FIG. 2 that depicts a general flow chart for the method of FIG. 1.

In FIG. 1, an example flash memory is illustrated by a single vertical column in the figure. The example flash memory comprises 2 sectors of NOR flash memory, with each sector in this example comprising 2 memory blocks. For example, Sector "0" is made up of Block A and Block B. Each block comprises enough NOR flash memory cells to hold at least 1 setting plus a small un-shown maintenance section as is known to one skilled in the art. In this example, each block may comprise 2K NOR flash memory cells, although this number could be different according to design considerations. Thus here, Sector "0" comprises a total of 4 k and the entire sector must be erased when erasure is desired.

When the memory controller attempts to write a setting into the NOR flash memory, it will follow the flowchart 200 shown in FIG. 2. Throughout this disclosure, the word "written" when referring to a block of memory means that a current setting, possibly a default setting, has been written into that block of memory since that block of memory was last erased. Also as well known in the art, each time a block is written or a sector is erased, tables, pointers, and/or maintenance sections of the altered blocks normally are updated to reflect that the status of the various sections of the NOR flash memory and/or the location of the most current setting.

First, in Step 210, the memory controller will write to Block A of Sector "0". In FIG. 1, nothing has yet been written into the NOR flash memory so the memory controller will write the setting into Block A of Sector "0" as is shown, updating any tables, pointers, or maintenance sections to reflect that the current setting is in Block A of Sector "0". If a factory default was preloaded into Block A of Sector "0" that constitutes the $1^{st}$ writing.

In Step 220, the memory controller will write the setting into Block C of Sector "1" as is shown in the $2^{nd}$ writing column of FIG. 1, again updating any tables, pointers, or maintenance sections to reflect that the current setting is in Block C of Sector "1".

In Step 230, the memory controller will write the setting into Block B of Sector "0" as is shown in $3^{rd}$ writing column of FIG. 1.

In Step 240, the memory controller will write the setting into Block D of Sector "1" as is shown in $4^{th}$ writing column of FIG. 1.

In Step 250, the memory controller will erase Sector "0", and then write to Block A of Sector "0" as is shown in $5^{th}$ writing column of FIG. 1.

In Step 260, the memory controller will erase Sector "1", and then write to Block C of Sector "1" as is shown in $6^{th}$ writing column of FIG. 1.

In Step 270, as can be seen from FIG. 1, the NOR flash memory has returned to the same state as after the $2^{nd}$ writing column so the process returns to Step 230, followed by Step 240, etc.

This disclosed embodiment of a writing method to NOR flash memory helps ensure that if a current setting cannot be properly read from the NOR flash memory, error recovery is simplified, usually limited to a loss of only the most recent setting, rather than having to always return to the factory default.

Please refer now to FIGS. 3-6 which respectively illustrate how error recovery may be performed when the method of writing previously described has been used.

Figure 3:
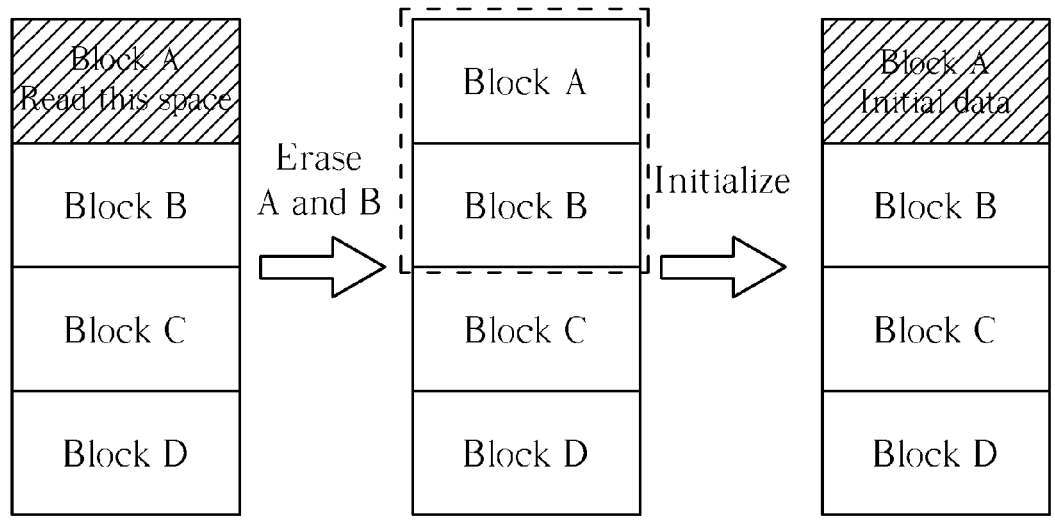
FIGS. 3-6 illustrate error recovery in the NOR flash memory of FIG. 1 according to another embodiment of a memory controller.

FIG. 3 illustrates error recovery when there is an error reading from Block A of Sector "0". Blocks A and B of Sector "0" are erased and initial (or default) data is written into Block A of Sector "0".

Figure 4:
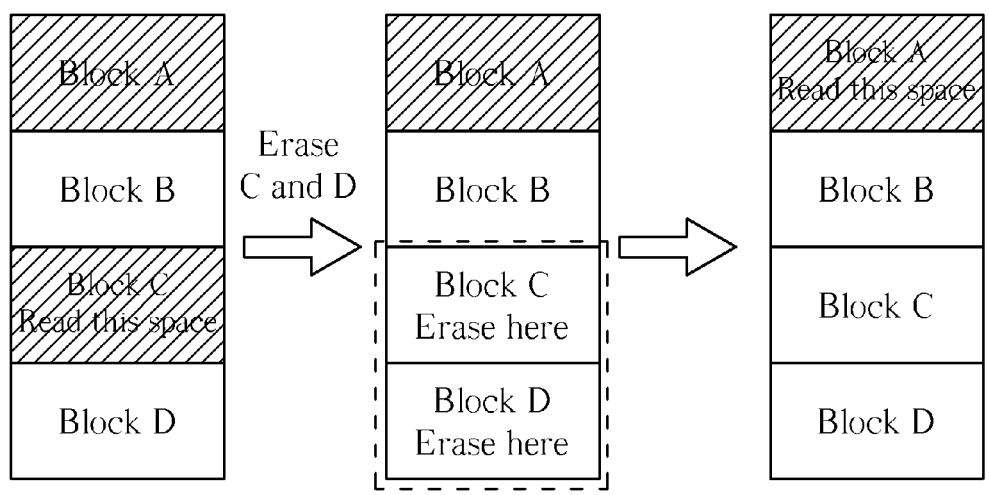

In FIG. 4, an error is detected when reading from Block C of Sector "1". In this case, Sector "1" is erased and the setting read from Block A of Sector "0". Note, Block A of Sector "1" contains the most resent setting and is thus often more useful than a default setting.

Figure 5:
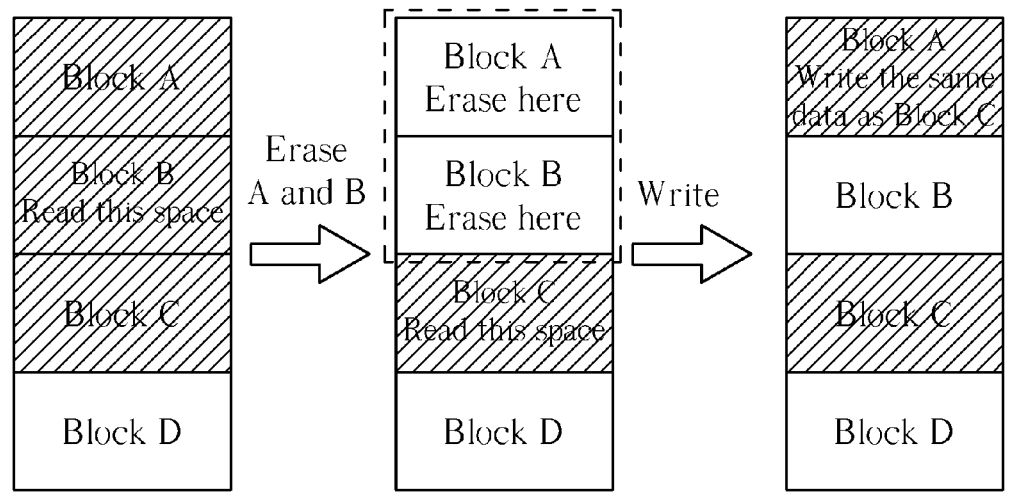

FIG. 5 illustrates error recovery when there is an error reading from Block B of Sector "0". Here, Blocks A and B of Sector "0" are erased, the setting is read from Block C of Sector "1" and the read setting is written into Block A of Sector "0".

Figure 6:
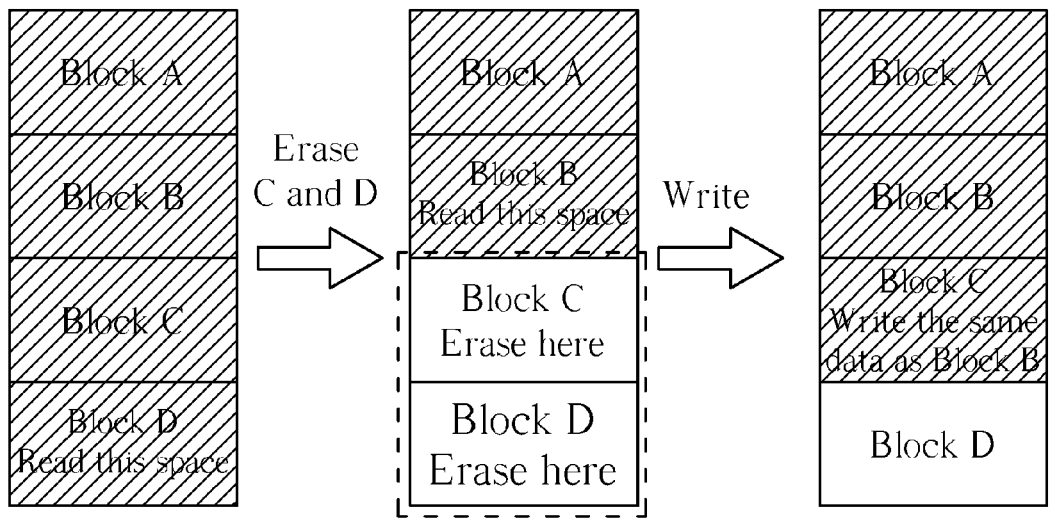

In FIG. 6, an error is detected when reading from Block D of Sector "1". In this case, Sector "1" is erased, the setting is read from Block B of Sector 1 and the read setting is written into Block C of Sector "1".

Figure 7:
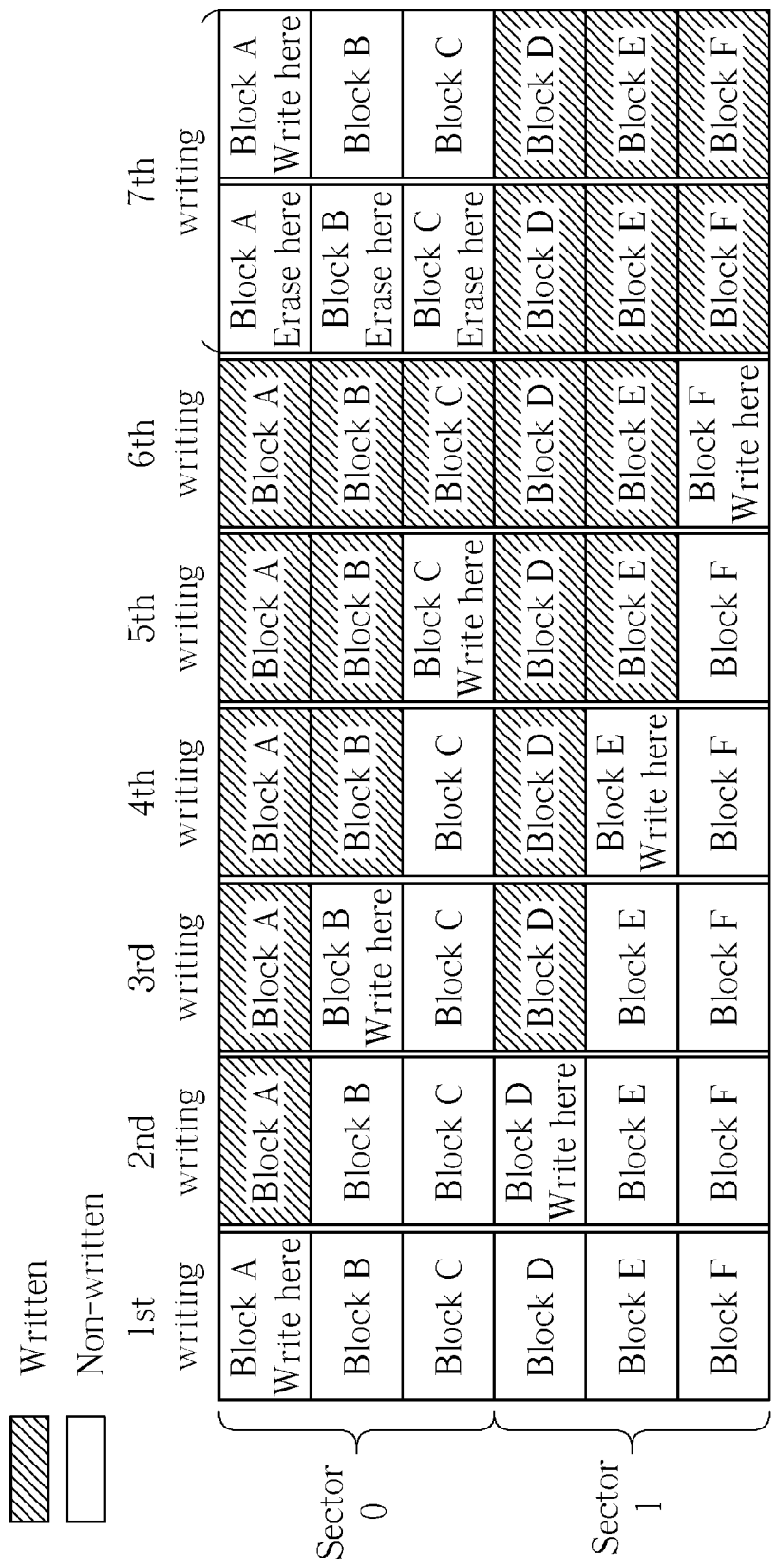
FIG. 7 illustrates a method of writing to a structurally different NOR flash memory according to one embodiment of a memory controller.

Please turn now to FIG. 7, which illustrates how the method of writing disclosed above can be extended to a structurally different NOR flash memory according to one embodiment of a memory controller. Here each sector includes more than two blocks, perhaps 3 as is shown in FIG. 7.

As before, the method begins by writing to sequentially $1^{st}$ blocks in each of the sectors, followed by $2^{nd}$ blocks in each of the sectors, and finally to $3^{rd}$ blocks in each of the sectors. If there are more than 3 blocks in each sector, they would be written to in a continuation of this sequence.

After the $6^{th}$ writing in this example, all of the blocks in the NOR flash memory have been written so erasure is needed before any additional writing. Thus, as shown in FIG. 7, when a $7^{th}$ writing is needed, Sector "0" is erased, followed by writing of the setting into Block A of Sector "0".

If an additional writing is necessary, Sector "1" should be erased and the additional setting written into Block D of Sector "1". The process would then continue as before with the next writing going into Block B of Sector "1". It is assumed that one skilled in the art can continue this process indefinitely without deviating from the disclosed method.

Figure 8:
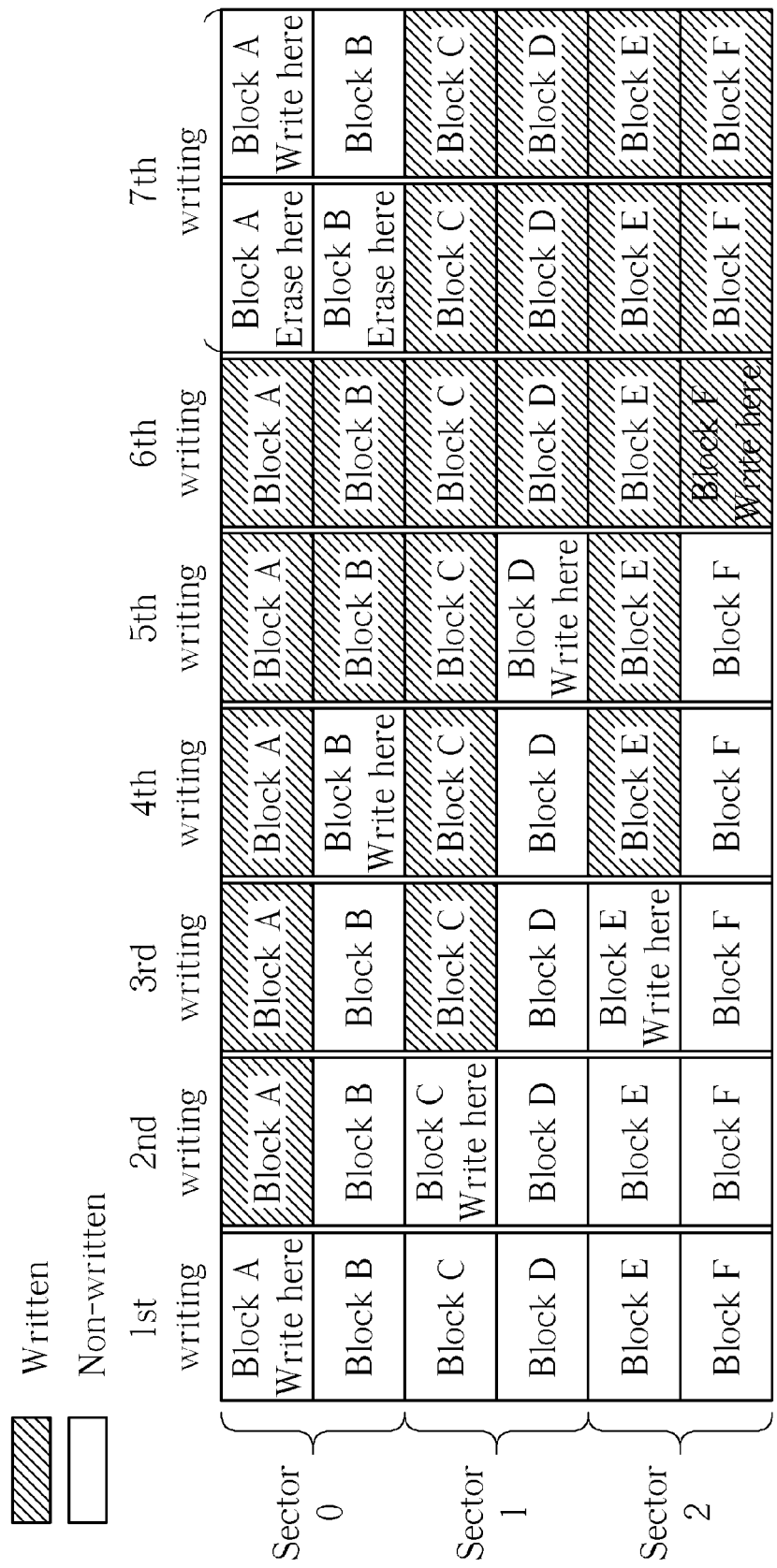
FIG. 8 illustrates a method of writing to another structurally different NOR flash memory according to one embodiment of a memory controller.

FIG. 8 illustrates how the method of writing disclosed above can be extended to another structurally different NOR flash memory according to one embodiment of a memory controller. Here, there are than 2 sectors, perhaps 3 as is shown in FIG. 8.

As before, the method begins by writing to sequentially $1^{st}$ blocks in each of the sectors, followed by $2^{nd}$ blocks in each of the sectors, and finally to $3^{rd}$ blocks in each of the sectors. If there are more than 3 blocks in each sector, they would be written to in a continuation of this sequence.

After the $6^{th}$ writing in this example, all of the blocks in the NOR flash memory have been written so erasure is needed before any additional writing. Thus, as shown in FIG. 8, when a $7^{th}$ writing is needed, Sector "0" is erased, followed by writing of the setting into Block A of Sector "0".

If an additional writing is necessary, Sector "1" should be erased and the additional setting written into Block D of Sector "1". When a subsequent writing is needed, Sector "2" should be erased and the subsequent setting written into Block E of Sector "2". Again, the process would then continue as before with the next writing going into Block B of Sector "1". It is assumed that one skilled in the art can continue this process indefinitely without deviating from the disclosed method.

Figure 9:
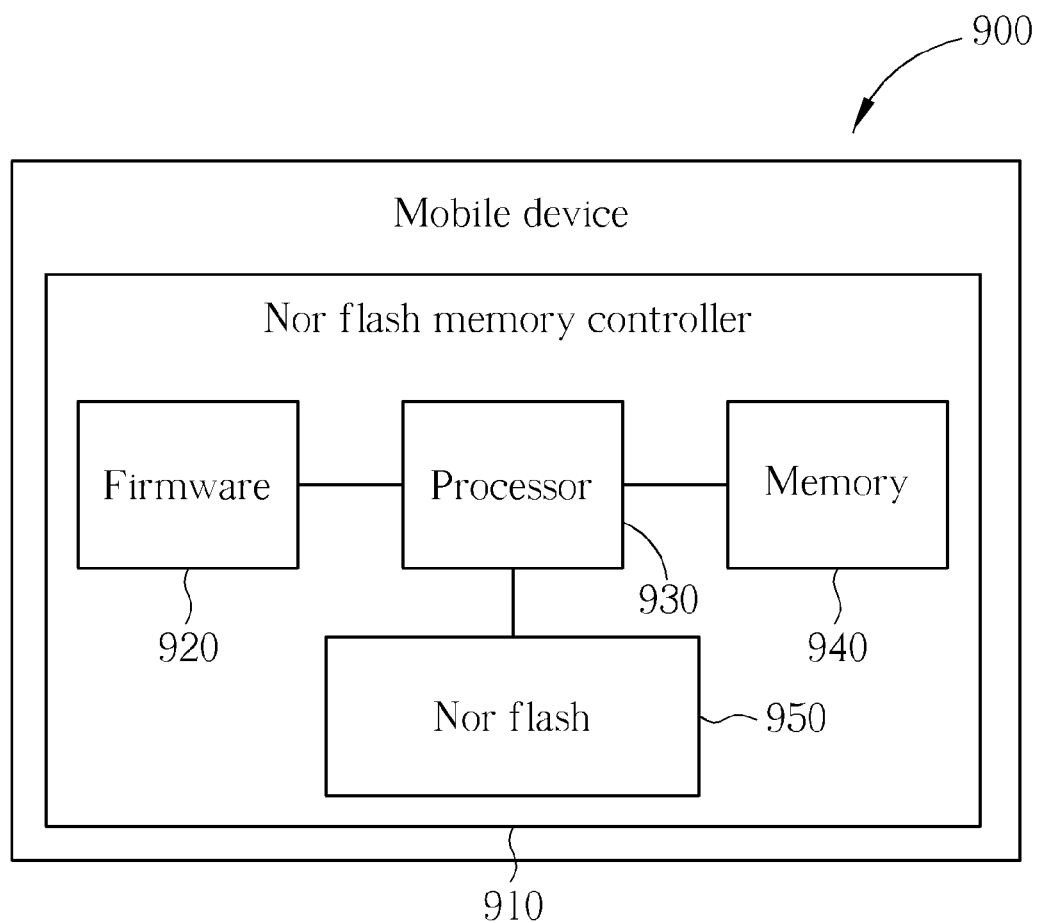
FIG. 9 is a functional block diagram of a mobile device which utilizes a NOR flash memory controller according to at least one embodiment of the disclosure.

FIG. 9 is a functional block diagram of a mobile device 900 which utilizes a NOR flash memory controller according to at least one embodiment of the disclosure. The mobile device 900 comprises a NOR flash memory controller 910, which in turn may comprise firmware for controlling operations of the NOR flash memory 950, a memory 940 for storing data and/or program code for controlling operations of the mobile device 900, a NOR flash memory 950 for storing settings, and a processor 930 coupled directly or indirectly to each of the firmware 920, memory 940, and Nor flash memory 950 for carrying out the methods disclosed herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of operating a NOR flash memory controller, the method comprising:
   the memory controller sequentially writing to a sequentially first block of each sector of the NOR flash memory;
   the memory controller sequentially writing to a sequentially second block of each sector of the NOR flash memory; and
   when all blocks of all sectors of the NOR flash memory have been written, the memory controller erasing a sequentially first sector and then writing to the sequentially first block of the sequentially first sector.

2. The method of claim 1 further comprising after erasing the sequentially first sector and then writing to the sequentially first block of the sequentially first sector, erasing the sequentially second sector and then writing to the sequentially first block of the sequentially second sector.

3. The method of claim 1 further comprising after the memory controller sequentially writing to a sequentially first block of each sector of the NOR flash memory and before the memory controller sequentially writing to a sequentially second block of each sector of the NOR flash memory, the memory controller sequentially writing to a sequentially third block of each sector of the NOR flash memory.

4. A method of error recovery utilized by a NOR flash memory controller, the method comprising:
   the memory controller sequentially writing to a sequentially first block of each sector of the NOR flash memory;
   the memory controller sequentially writing to a sequentially second block of each sector of the NOR flash memory;
   when all blocks of all sectors of the NOR flash memory have been written, the memory controller erasing a sequentially first sector and then writing to the sequentially first block of the sequentially first sector; and
   when there is an error reading from the sequentially first block of the sequentially sector, erasing the sequentially first sector and writing initial data into sequentially first block of the sequentially first sector.

5. The method of claim 4 further comprising when an error is detected when reading from the sequentially first block of a sequentially second sector, erasing the sequentially second sector and reading data from the sequentially first block of the sequentially first sector.

6. The method of claim 5 further comprising when an error is detected when reading from a sequentially second block of the sequentially first sector, erasing the sequentially first sector, reading data from the sequentially first block of the sequentially second sector and the read data is written into the sequentially first block of the sequentially first sector.

7. The method of claim 6 further comprising when an error is detected when reading from the sequentially second block of the sequentially second sector, erasing the sequentially second sector, reading data from the sequentially second block of the sequentially first sector and the read data is written into the sequentially first block of the sequentially second sector.

8. A mobile device comprising:
   a NOR flash memory for storing settings of the mobile device;
   a NOR flash memory controller having a memory storing data and/or program code for controlling operations of the NOR flash memory; and
   a processor coupled to the memory and the NOR flash memory for executing the program code;
   wherein the program code when executed by the processor causes the memory controller to sequentially write to a sequentially first block of each sector of the NOR flash memory, then write to a sequentially second block of each sector of the NOR flash memory, and when all blocks of all sectors of the NOR flash memory have been written, the memory controller erases a sequentially first sector and then writes to the sequentially first block of the sequentially first sector.

9. The mobile device of claim 8 wherein the memory is firmware.

* * * * *